US012746679B2

(12) United States Patent
Christman et al.

(10) Patent No.: US 12,746,679 B2
(45) Date of Patent: Sep. 29, 2026

(54) PROCESS CENTRIC USER CONFIGURABLE STEP FRAMEWORK FOR COMPOSING MATERIAL FLOW AUTOMATION

(71) Applicant: Seegrid Corporation, Pittsburgh, PA (US)

(72) Inventors: Andy Christman, Pittsburgh, PA (US); Andrew DiFurio, Pittsburgh, PA (US); Atticus Huberts, Pittsburgh, PA (US); Tina Janulis, New York, NY (US); Tri-An Le, Pittsburgh, PA (US); Jesse Legg, Pittsburgh, PA (US); Stephen Ramusivich, McMurray, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 28 days.

(21) Appl. No.: 18/527,699

(22) Filed: Dec. 4, 2023

(65) Prior Publication Data

US 2024/0181645 A1 Jun. 6, 2024

Related U.S. Application Data

(60) Provisional application No. 63/430,174, filed on Dec. 5, 2022.

(51) Int. Cl.
*B25J 9/16* (2006.01)

(52) U.S. Cl.
CPC .................................. *B25J 9/1689* (2013.01)

(58) Field of Classification Search
None
See application file for complete search history.

(56) References Cited

U.S. PATENT DOCUMENTS

| | | | | |
|---|---|---|---|---|
| 9,821,455 | B1 * | 11/2017 | Bareddy | G06Q 10/06 |
| 10,089,586 | B2 | 10/2018 | Vestal et al. | |
| 10,556,334 | B1 * | 2/2020 | Theobald | B25J 9/00 |
| 10,570,736 | B2 | 2/2020 | Wang et al. | |
| 2012/0197464 | A1 * | 8/2012 | Wang | G05D 1/0038 701/28 |
| 2016/0378110 | A1 | 12/2016 | Phillips et al. | |
| 2017/0356292 | A1 | 12/2017 | Wang et al. | |
| 2021/0018912 | A1 | 1/2021 | Dymesich et al. | |
| 2021/0048829 | A1 * | 2/2021 | Deyle | G05D 1/0274 |
| 2022/0151450 | A1 * | 5/2022 | Case | B25J 13/003 |
| 2022/0348409 | A1 | 11/2022 | Sun et al. | |

OTHER PUBLICATIONS

International Search Report and Written Opinion dated Apr. 3, 2024 issued in International Application No. PCT/US2023/082251.
Extended European Search Report dated Jun. 18, 2026 issued in European Application No. 23901382.4.

* cited by examiner

*Primary Examiner* — Arslan Azhar
(74) *Attorney, Agent, or Firm* — Onello & Mello PC

(57) ABSTRACT

A system and method are provided that provides a framework for modeling repeatable tasks for robots, such as AMRs, to complete. Using the framework, jobs may be built using a software tool that allows users to create a series of steps that the robot will perform. Each step includes two elements: location and task, which may be presented by a processor to a user interface, allowing a user to fill in a location and task. By combining steps, an unlimited number of material flows may be created.

20 Claims, 8 Drawing Sheets

PROCESS CENTRIC USER CONFIGURABLE STEP FRAMEWORK FOR COMPOSING MATERIAL FLOW AUTOMATION

CROSS REFERENCE TO RELATED APPLICATIONS

The present application claims priority to U.S. Provisional Patent Application 63/430,174, filed Dec. 5, 2022, entitled Process Centric User Configurable Step Framework for Composing Material Flow Automation, which is incorporated herein by reference in its entirety.

The present application may be related to International Application No. PCT/US23/016556 filed on Mar. 28, 2023, entitled A Hybrid, Context-Aware Localization System For Ground Vehicles; International Application No. PCT/US23/016565 filed on Mar. 28, 2023, entitled Safety Field Switching Based On End Effector Conditions In Vehicles; International Application No. PCT/US23/016608 filed on Mar. 28, 2023, entitled Dense Data Registration From An Actuatable Vehicle-Mounted Sensor; International Application No. PCT/US23,016589, filed on Mar. 28, 2023, entitled Extrinsic Calibration Of A Vehicle-Mounted Sensor Using Natural Vehicle Features; International Application No. PCT/US23/016615, filed on Mar. 28, 2023, entitled Continuous And Discrete Estimation Of Payload Engagement Disengagement Sensing; International Application No. PCT/US23/016617, filed on Mar. 28, 2023, entitled Passively Actuated Sensor System; International Application No. PCT/US23/016643, filed on Mar. 28, 2023, entitled Automated Identification Of Potential Obstructions In A Targeted Drop Zone; International Application No. PCT/US23/016641, filed on Mar. 28, 2023, entitled Localization of Horizontal Infrastructure Using Point Clouds; International Application No. PCT/US23/016591, filed on Mar. 28, 2023, entitled Robotic Vehicle Navigation With Dynamic Path Adjusting; International Application No. PCT/US23/016612, filed on Mar. 28, 2023, entitled Segmentation of Detected Objects Into Obstructions and Allowed Objects; International Application No. PCT/US23/016554, filed on Mar. 28, 2023, entitled Validating the Pose of a Robotic Vehicle That Allows It To Interact With An Object On Fixed Infrastructure; and International Application No. PCT/US23/016551, filed on Mar. 28, 2023, entitled A System for AMRs That Leverages Priors When Localizing and Manipulating Industrial Infrastructure; International Application No.: PCT/US23/024114, filed on Jun. 1, 2023, entitled System and Method for Generating Complex Runtime Path Networks from Incomplete Demonstration of Trained Activities; International Application No.: PCT/US23/023699, filed on May 26, 2023, entitled System and Method for Performing Interactions with Physical Objects Based on Fusion of Multiple Sensors; International Application No.: PCT/US23/024411, filed on Jun. 5, 2023, entitled Lane Grid Setup for Autonomous Mobile Robots (AMRs); International Application No.: PCT/US23/033818, filed on Sep. 27, 2023, entitled Shared Resource Management System and Method; International Application No.: PCT/US23/079141, filed on Nov. 8, 2023, entitled System And Method For Definition Of A Zone Of Dynamic Behavior With A Continuum Of Possible Actins and Locations Within Same; International Application No.: PCT/US23/078890, filed on Nov. 7, 2023, entitled Method And System For Calibrating A Light-Curtain; International Application No.: PCT/US23/036650, filed on Nov. 2, 2023, entitled System and Method for Optimized Traffic Flow Through Intersections with Conditional Convoying Based on Path Network Analysis; U.S. Provisional Appl. 63/430,184 filed on Dec. 5, 2022, entitled Just in Time Destination Definition and Route Planning; U.S. Provisional Appl. 63/430,182 filed on Dec. 5, 2022, entitled Composable Patterns of Material Flow Logic for the Automation of Movement; U.S. Provisional Appl. 63/430,190 filed on Dec. 5, 2022, entitled Configuring a System That Handles Uncertainty with Human and Logic Collaboration in A Material Flow Automation Solution; U.S. Provisional Appl. 63/430,195 filed on Dec. 5, 2022, entitled Generation of "Plain Language" Descriptions Summary of Automation Logic; U.S. Provisional Appl. 63/430,171 filed on Dec. 5, 2022, entitled Hybrid Autonomous System Enabling and Tracking Human Integration into Automated Material Flow; U.S. Provisional Appl. 63/430,180 filed on Dec. 5, 2022, entitled A System for Process Flow Templating and Duplication of Tasks Within Material Flow Automation; U.S. Provisional Appl. 63/430,200 filed on Dec. 5, 2022, entitled A Method for Abstracting Integrations Between Industrial Controls and Autonomous Mobile Robots (AMRs); and U.S. Provisional Appl. 63/430,170 filed on Dec. 5, 2022, entitled Visualization of Physical Space Robot Queuing Areas as Non Work Locations for Robotic Operations, each of which is incorporated herein by reference in its entirety.

The present application may be related to U.S. patent application Ser. No. 11/350,195, filed on Feb. 8, 2006, U.S. Pat. No. 7,466,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S. Pat. No. 8,864,164, Issued on Oct. 21, 2014, entitled Tugger Attachment; U.S. Design patent application Ser. No. 29/398,127, filed on Jul. 26, 2011, U.S. Pat. No. D680,142, Issued on Apr. 16, 2013, entitled Multi-Camera Head; U.S. Design patent application Ser. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 17/712,660, filed on Apr. 4, 2022, US Publication Number 2022/0297734, Published on Sep. 22, 2022, entitled Laterally Operating Payload Handling Device; U.S. patent application Ser. No. 16/892,549, filed on Jun. 4, 2020, U.S. Pat. No. 11,693,403, Issued on Jul. 4, 2023, entitled Dynamic Allocation And Coordination of Auto-Navigating Vehicles and Selectors; U.S. patent application Ser. No. 18/199,052, filed on May 18, 2023, Publication Number 2023/0376030, Published on Nov. 23, 2023, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022/0100195, Published on Mar. 31, 2022, entitled Vehicle Object-Engagement Scanning System And Method; U.S. patent application Ser. No. 17/478,338, filed on Sep. 17, 2021, US Publication Number 2022/0088980, Published on Mar. 24, 2022, entitled Mechanically-Adaptable Hitch Guide; U.S. patent application Ser. No. 29/832,212, filed on Mar. 25, 2022, entitled Mobile Robot, each of which is incorporated herein by reference in its entirety.

FIELD OF INTEREST

The present inventive concepts relate to the field of robotics and autonomous mobile robots (AMRs). In particular, the inventive concepts may be related to systems and methods in the field of material flow automation.

BACKGROUND

Autonomous vehicles may travel through areas or along pathways that are shared with other vehicles, including other autonomous vehicles, semi-autonomous vehicles, manually operated vehicles, or with pedestrians. The autonomous vehicles can take a variety of forms and can be referred to using various terms, such as mobile robots, robotic vehicles, automated guided vehicles, and/or autonomous mobile robots (AMRs). In some cases, these vehicles can be configured for operation in an autonomous mode where they self-navigate or in a manual mode where a human directs the vehicle's navigation. Herein, vehicles that are configured for autonomous navigation are referred to as AMRs.

Multiple AMRs may have access to an environment within which the state of the environment and the state of an AMR are constantly changing. The environment can be within, a processing center, a manufacturing center, or a warehouse for example and the AMRs can include, but are not limited to, pallet lifts, pallet trucks, and tuggers.

Industrial AMRs may employ industrial controllers, such as, programmable logic controllers (PLCs), to achieve a higher level of automation. In order to fully leverage PLCs in industrial automation, PLCs attached to a warehouse's processes may be integrated with a fleet manager, which may include a processor, such as a central processor or server, and fleet management software. In example embodiments the integration of AMRs and the PLCs they employ with a fleet manager may employ a generalized approach to abstract the integration between industrial controllers and AMRs. A PLC may provide a fleet management system information about the occupancy state of certain locations and may request a job, a material flow process, when materials need to be moved. In this way, the fleet management system employs a PLC to provide a higher level of automation to AMRs. For example, a PLC may be attached to a set of sensors that monitor whether a location, which may be in one location in a group of locations, is occupied by material. The PLC may report the occupancy status (e.g., a "True," occupied, or "False" unoccupied) of the location to the fleet management system. The sensor maps back to a specific location in the fleet management system. Based on the occupancy state, any job steps that require PLC input for selecting a location from the group that has sensors monitoring it, the fleet management system will only select a location with the appropriate occupancy status (e.g., a pick will be directed to a location that is occupied with material and a drop will be directed to a location that is not occupied with material).

In example embodiments AMRs employ user-defined instructions to move material about a facility. These user-defined instructions direct the AMR where and when to move the material. A user framework may be employed to allow a user to create AMR movement instructions. The framework allows a user to create movement instructions without developing detailed software instructions. Providing a framework that allows a user to create AMR material movement instructions is challenging because of the diversity of workflows in which AMRs must operate.

One highly flexible approach to generate AMR movement instructions, one that is also highly complex, entails the use of "if this then that" style rules created by a user to define AMR instructions for material movement. For example, consider a workflow that requires an AMR to, on request, pick up at location 1 and drop at location 2. A conventional approach to fleet management using an "if this, then that" approach will provide users with a set of triggers, actions, and entities for data store to compose a rule with. To create this workflow, users will need to create a set of rules that enable the following behavior: 1) when an input is received queue a request, 2) when an AMR becomes available at a specific set of locations and is not currently performing other work, assign it any queued work, and 3) when there is no queued work and an AMR becomes available, send the AMR to a location at which to wait. While there are three primary behaviors in this scenario, users must create these three primary behaviors using rules, depending on the types of triggers, actions, and data stores the system provides, and each behavior might take several rules to implement. For example, to implement behavior number 2, the rules might be: "If an AMR arrives at station x and is not assigned a tag indicating it's on a job (data store used to set a flag on a vehicle) and the work queue is not empty, then assign the AMR the follow in the first item in the queue and remove that item from the queue and assign that AMR a tag indicating it is on a job." This example conventional system does not support mixing AND and OR logic in triggers so, a variation of this rule will need to be created for each station the AMR can become available at and assigned a route. This conventional approach has several drawbacks. User must be familiar enough with the available triggers, actions, and data stores to come up with a set of rules to enable the behavior they desire. They must be technically capable enough to create "If this, then that" logic, which is similar in difficulty to simple programming. It is challenging for someone previously unfamiliar with the rules a user created to understand the behavior the rules are enabling.

Although flexible, allowing for the creation of any AMR instruction, an "fi this then that" approach is time consuming, a large number of rules may be required to complete a movement, and "if this then that" statements are technical and brittle. Rule complexity and proliferation lengthens AMR deployment times, increases system errors, and hinders user adoption and comprehension. There are often repeated patterns across customer facilities and each user of this rule based system may create a different set of rules to accomplish the exact same workflow.

SUMMARY

A framework for modeling repeatable robotic tasks is provided. The framework may be referred to herein as a "jobs framework." Using the framework, jobs may be built using a software tool that allows users to create a series of steps that the robot will perform. That is, a job may comprise one or more steps and each step is created by a user. Each step includes two elements: 1) "Go here" and 2) "Do this," which may be presented by a processor to a user interface, allowing a user to fill in a location and an action (e.g., pick or drop). By combining steps, a nearly unlimited number of material flows may be created.

In example embodiments at least three elements may be included in a system and method: a trigger section, a job step, and the option of selecting a Location Group. The trigger section allows for a logical condition to be configured that, if met, will fire an instance of a job. The job step, consists of user-configurable "Go here" and "Do this" instructions, or sections. The ability to select a Location Group in the "Go here" section allows for one job to address multiple permutations of a job (e.g., pick here and drop at one of these 5 locations). All possible applications can be modeled with the two core components of: location ("Go here") and action ("Do this"). Each step includes the two core components and the system and method allows for as many steps as may be required for a desired material movement.

In example embodiments a system may include at least one autonomous mobile robot (AMR) and a management system comprising at least one processor configured to provide a framework for user-configurable control of an AMR, the control comprising a job of one or more steps, each step including a location and a task.

In example embodiments a job may be defined as a series of steps through a user interface.

In example embodiments a task may be chosen from: a pick or a drop.

In example embodiments a system may include a trigger section to allow the selection of a logical condition to be configured to fire an instance of a job.

In example embodiments a system may include a processor configured to allow the selection of a location group as the location.

BRIEF DESCRIPTION OF THE DRAWINGS

The present inventive concepts will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
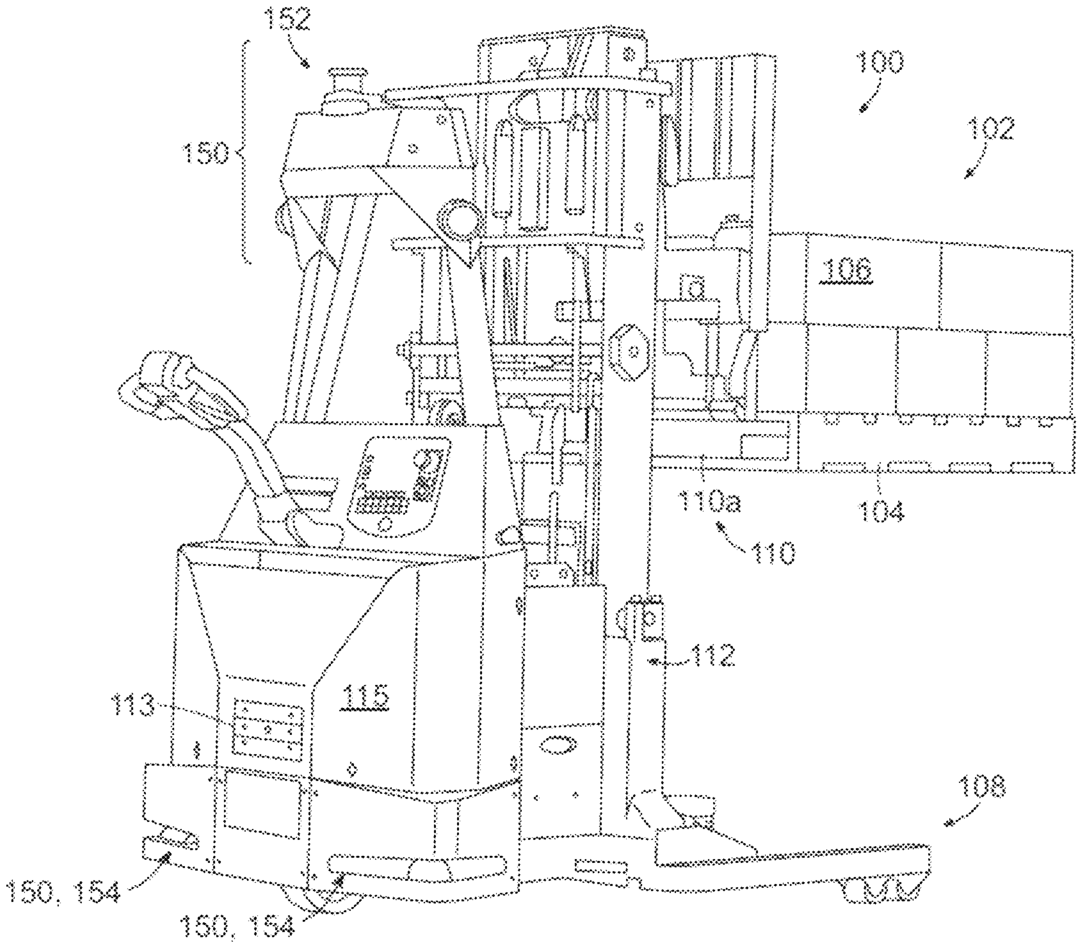
FIG. 1 is a perspective view of an embodiment of an AMR forklift that comprises an embodiment of the systems described herein, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In example embodiments, a system and method in accordance with principles of inventive concepts provide a framework for creating autonomous mobile robot (AMR) instructions that strikes a balance between flexibility and complexity by leveraging layers of novel work abstractions enabled by the system, allowing an operator to configure a series of AMR instructions using simple straightforward commands that instruct an AMR to go to a location and carry out a behavior, for example.

In example embodiments, a system and method in accordance with principles of inventive concepts provides a framework for modeling repeatable tasks for robots, such as AMRs, to complete. The framework may be referred to herein as a "jobs framework" or job template. Using the framework, jobs may be built using a tool that allows users to create a series of steps that the robot will perform. That is, a job may comprise one or more steps and each step is created by a user to include, in example embodiments, at least two elements of the nature: 1) "Go here" and 2) "Do this." In example embodiments a system may present a template to a user interface for the user to fill in steps, step elements and a trigger to configure a job. In example embodiments a user may fill in a location and an action (e.g., pick, drop, wait, hitch, unhitch, lift, or exchange). //. By combining steps, a nearly unlimited number of material flows may be created.

In example embodiments a system and method may allow an operator to create a job using three components: a trigger section, a job step (which includes two elements in example embodiments), and the option of selecting a Robot Group. The trigger section allows for a logical condition to be configured that, if met, will fire an instance of a job. The job step can include user-configurable "Go here" and "Do this" instructions, or sections. The ability to select a Location Group in the "Go here" section allows for one job to address multiple permutations of a job (e.g., pick here and drop at one of these 5 locations). All possible applications can be modeled with the two core components of: location ("Go here") and action ("Do this"). Each step includes the two core components and the system and method allows for as many steps as may be required for a desired material movement.

In example embodiments, a system allows a user to define a sequence of AMR instructions, called steps, for the execution of material movement. A job comprises one or more steps. These user-configurable jobs can then be requested via a configurable trigger, such as an operator request or programmable logic controller (PLC) request. Together, the steps and trigger are used to create two layers of abstractions. In example embodiments, each step contains the location to which the AMR should travel and what it should do when it arrives at that location. There are times, however, when the specific location may not be known until after the job (comprising a plurality of steps) is triggered.

In example embodiments, a first layer of abstraction is that of job steps. Each step may contain an indication of to what location the AMR is to travel and what the AMR should do once it arrives at that location. Because, as noted above, the specific location to which the AMR is to travel may not be known until after the job is triggered, an operator may instead provide A) a set of possible locations—a location group—and, B) an indication of the source from which the specific location will be obtained—a location group selector—(e.g., from an operator (at a specific user interface, for example), from a processor configured as a fleet manager, or from an external system such as a PLC). The process of employing a set of possible locations is described in greater detail in co-filed application entitled "CONFIGURING A SYSTEM THAT HANDLES UNCERTAINTY WITH HUMAN AND LOGIC COLLABORATION IN A MATERIAL FLOW AUTOMATION SOLUTION," U.S. Ser. No. 63/430,190, which is hereby incorporated by reference in its entirety. The process of indicating the source of specific location information is described in greater detail in co-filed application entitled "A METHOD FOR ABSTRACTING INTEGRATIONS BETWEEN INDUSTRIAL CONTROLS AND AMRS," U.S. Ser. No. 63/430,200, which is hereby incorporated by reference in its entirety.

By breaking a job into a sequence of steps, each with a location and task, a system in accordance with principles of inventive concepts allows users to flexibly describe a host of AMR material movements with minimal complexity. Using the first level of abstraction, a step sequence, a system and method in accordance with principles of inventive concepts, abstracts away from the user a second layer of abstraction, which provides a high level of flexibility. The second layer of abstraction identifies: 1) the type of AMR required, such as a tugger or pallet truck, 2) the method by which the AMR understands locations, and 3) the type of instructions the AMR can process. In operation, when a job is requested by a user, the system itself (in the form of a processor configured as a fleet manager, for example. uses the steps developed at the first abstraction level by the user to determine, at the second level of abstraction, the type of AMR required to execute the job and translates the sequence of job steps into instructions the AMR understands.

A system and method in accordance with principles of inventive concepts may employ methods described in greater detail in related applications "SYSTEMS AND METHODS FOR FOR MATERIAL FLOW AUTOMATION," U.S. Ser. No. 63/430,182, "JUST IN TIME DESTINATION DEFINITION AND ROUTE PLANNING," U.S. Ser. No. 63/430,184, and "A METHOD FOR ABSTRACTING INTEGRATIONS BETWEEN INDUS- TRIAL CONTROLS AND AMRS," U.S. Ser. No. 63/430,200, which are hereby incorporated by reference in their entirety, to implement a user-friendly step-oriented system and method as described herein.

Employing a system and method in accordance with principles of inventive concepts allows a user to create AMR instructions with a capability similar to that of a rules-based ("if this, then that") approach, affording a high degree of flexibility, while presenting users with a much lower degree of complexity. Employing the current system and method, users need not be highly technically competent and need not be deeply familiar with a specific AMR system to create robust instructions; they only need to be familiar with a facility's desired work flow. A "job steps" framework in accordance with principles of inventive concepts is not strictly tied to any manufacturer's primitives, such as stations or segments or to how a manufacturer communicates with its AMRs. Additionally, a jobs steps framework in accordance with principles of inventive concepts has applicability for any system of automation in which a user needs to instruct an AMR on how to move material. While the system and method is described herein with respect to example embodiments employing AMRs, with the focus on location and action, the approach is not limited to the current suite of robot chassis types that any manufacturer currently offers.

Another key benefit is that this system enables end-users, or customers, to have the confidence to make changes themselves. With conventional approaches an end-user may be intimidated by the complexity of a rules based, "if this then that" approach. By reducing the complexity of the first layer of abstraction, the steps that build a job, end-users with a much lower degree of technical expertise can confidently and competently implement and alter material movements within their facilities.

A system and method in accordance with principles of inventive concepts allows an operator to create a job to be performed by one or more AMRs within a facility (for example, a manufacturing facility, a processing facility, a warehouse, etc.) within which material flows take place. Such facilities are not limited to indoor facilities and may include outdoor material flow facilities such as lumberyards, for example.

In example embodiments a "job" may consist of one or more steps defined by the operator. In a warehouse implementation a job may be created by an operator in response to the receipt of an order to be filled by the warehouse. One or more items stored within the warehouse may be included in the order and the operator configures a job to address the requirements of the order. In one of its simpler forms the order may request a single item and the operator creates a job that may consist of a single step that instructs an AMR to retrieve the single item from the items location within the warehouse and to position it, for example, in a shipping/staging area, ready for pickup by a truck or train.

It is anticipated, however, that jobs will be substantially more complex, involving a plurality of steps. An order for a number of items may entail retrieving items from a number of locations within the warehouse, using a plurality of AMRs to re-position the various items for shipping, for example.

In a warehouse implementation Jobs may also be created simply to reorganize items within the warehouse or in response to the receipt of a shipment, for example. In response to the receipt of a shipment an operator create a job to move items from a receiving area to their appropriate storage locations within the warehouse. Other material flows, within manufacturing or processing facilities, in fact, within any facility that may employ an AMR in material flow are contemplated within the scope of inventive concepts. But, for the sake of clarity and brevity in explanation, discussions herein will be largely directed to warehouse implementations.

In example embodiments a system and method in accordance with principles of inventive concepts may employ a framework for that allows an operator to create material flow activities, otherwise referred to herein as "jobs." The framework will be referred to herein as a "jobs framework," and the series of one or more material flow steps created by an operator to execute the material flow will be referred to herein as a "job." As previously noted, the job may be created in response to a shipment or order received or anticipated within a warehouse, but inventive concepts are not limited thereto.

An operator may build a job, using the framework, by creating a series of steps that one or more AMRs will execute. In example embodiments each step may include one or more elements. Although many steps may include two elements, including a location-specific element ("go here") and an action-specific element ("do this"), single-element steps are contemplated within the scope of inventive concepts. For example, a step may include only a location-specific element ("go here") when the AMR is directed to a waypoint. In example embodiments a step may include two elements/instructions of the sort: 1 Go here (go to X location), 2 Do this (perform this operation when you get to X)

A user interface in accordance with principles of inventive concepts may present an interactive screen to an operator with a template allowing the operator to enter one or more steps, each of which includes one or more elements, or instructions. In example embodiments each step may include two instructions: 1. A location-specific instruction and (e.g., go to location X) and 2. A behavior-specific instruction (e.g., e.g., pick, drop, wait, hitch, unhitch, lift, or exchange). Additional behavior-specific instructions or elements may entail charging, whereby a system may select from a group of charging locations/stations and instruct an AMR to travel to the location and charge itself. The system may include a condition such as to charge the battery if the charge level is below a given threshold, for example. Other conditions, including the level to which the AMR should charge itself (e.g., minimum level, normal level, maximum level) may also be featured in example embodiments.

In example embodiments each job may include a trigger that requests the job at run time. The system responds to the request by initiating the job when all the all the requirements for the job, for example, an appropriate AMR is available and the AMR destination is not fully occupied, are met. The user interface may present trigger options to an operator in the form of a pulldown menu, for example. Triggers may include: Operator Display, PLC, WMS, Arrival at station, Schedule-Based, Periodic (every t seconds), Integration (could point to a custom adapter that integrates with some external system not generally supported), or Need-based (some state indicates a location needs replenishment), for example.

In example embodiments location-specific instructions may refer to a group of location, rather than an individual site, and a specific one of the group of locations may be chosen, as specified by the operator by any of a group of location selectors including: an operator, a central processing system or server, a WMS, MES, ERP, PLC, Human Operator, Web Client, smart device like a watch, push button, for example. In example embodiments virtually any external processor can provide such input so long as the processor is compatible with an existing API or uses an adapter, but at the core any external processor will be signaling something similar to the Fleet Management system.

The specific location from within the group may be chosen at some point after the operator configures the job, at run-time, for example. This feature allows an operator to configure a job, the general progress of which may be executed in a variety of instances, with the substitution of various locations selected from among the specified group of locations. In example embodiments, locations can be added to any location group by a user as long as that location type is allowed to be placed into a group. Locations need not be grouped by any shared attribute. Users can choose to group locations by a shared attribute such as source locations for cleaning products, if their process requires it. Based on the location types in the group, the system selects an AMR capable of interacting with any location type in that group.

Although inventive concepts may be employed with any of a variety of autonomous mobile robots (AMRs) for brevity and clarity of description example embodiments will be primarily directed herein to AMR fork trucks, an example embodiment of which is illustrated in FIG. 1.

FIG. 1 is a perspective view of an embodiment of an AMR forklift 100 in accordance with aspects of the inventive concepts that includes features described herein. In some embodiments, such as the one shown in FIG. 1, the AMR includes a load engagement portion 110, such as a pair of forks 110*a*, 110*b*.

The forks 110 extend from the AMR in a first direction. The AMR may be configured to travel primarily in the first direction and, secondarily, in a second direction. The second direction can be considered opposite to the first direction, understanding that the AMRs have turning capability in both directions. When an AMR travels into an intersection in one direction, i.e., the first or second direction, changing the travel direction to the other of the first and second directions will be referred to as "reverse" motion herein. In some embodiments, a direction the AMR initially travels into the intersection with will be considered to be a forward direction and subsequently traveling within or through the same intersection in the opposite direction will be considered reversing direction or travelling in the reverse direction.

Aspects of inventive concepts disclosed herein relate to safely increasing the throughput of AMRs through areas of possible conflict. In various embodiments, a user interface can be provided to input intersection information, for example, during training of an AMR. The user interface (UI) can be provided on the AMR or on a computer that communicates with the AMR, such as a laptop, tablet, phablet, desktop, mobile phone, or other such computer device having a user interface. A "wizard" may be generated at or within the UI to assist a user in inputting information necessary for travel through one or more intersections, e.g., the wizard user interface can present computer displays that guide a user through entering intersection information.

In some embodiments, aspects of the inventive concepts are configured to work with Seegrid AMRs, such as Seegrid's Palion™ line of AMRs. In some embodiments, aspects of the inventive concepts disclosed herein are configured to work with a warehouse management system (WMS), such as Seegrid Supervisor™, as described in greater detail below. In other embodiments, systems and methods in accordance with the inventive concepts can be implemented with other forms of autonomously navigated vehicles and/or mobile robots and warehouse management systems.

In example embodiments a robotic vehicle may include a user interface, such as a graphical user interface, which may also include audio or haptic input/output capability, that may allow feedback to be given to a human-trainer while registering a piece of industrial infrastructure (such as a pallet) to a particular location in the facility using a Graphical Operator Interface integral to the AMR. The interface may include a visual representation and associated text. In alternative embodiments, the feedback device may include a visual representation without text.

In some embodiments, the systems and methods described herein rely on the Grid Engine for spatial registration of the descriptors to the facility map. Some embodiments of the system may exploit features of "A Hybrid, Context-Aware Localization System for Ground Vehicles" which builds on top of the Grid Engine, Application No. PCT/US2023/016556, which is hereby incorporated by reference in its entirety. Some embodiments may leverage a Grid Engine localization system, such as that provided by Seegrid Corporation of Pittsburgh, PA described in U.S. Pat. Nos. 7,446,766 and 8,427,472, which is incorporated by reference in its entirety.

In some embodiments, an AMR may interface with industrial infrastructure to pick and drop pallets, for example. In order for an AMR to accomplish this, its perception and manipulation systems in accordance with principles of inventive concepts may maintain a model for what a pallet is, as well as models for all the types of infrastructure for which it will place the pallet (e.g., tables, carts, racks, conveyors, etc.). These models are software components that are parameterized in a way to influence the algorithmic logic of the computation.

In example embodiments a route network may be constructed by an operator through training-by-demonstration, wherein an operator leads the AMR through a training route and inputs behaviors (for example, picks or places) along the route. A build procedure employs information gathered during training (for example, odometry, grid information including localization information, and operator input regarding behaviors) into a route network. The route network may then be employed by an AMR to autonomously follow during normal operation. The route network may be modeled, or viewed, as a graph of nodes and edges, with stations as nodes and trained segments as edges. Behaviors may be trained within segments. Behaviors may include "point behaviors" such as picks and drops or "zone behaviors" such as intersections. In example embodiments an AMR's repetition during normal operations of a trained route may be referred to as a "follow." Anything, other than the follow itself, the AMR does during the follow may be viewed as a behavior. Zones such as intersections may include behaviors that are performed before, during, and/or after the zone. For intersections, the AMR requests access to the intersection from a supervisory system, also referred to herein as a supervisor or supervisory processor, (for example, Supervisor™ described elsewhere herein) prior to reaching the area covered by the intersection zone. When the AMR exits the zone, it releases that access to the supervisory system.

Referring to FIG. 1, shown is an example of a robotic vehicle 100 in the form of an AMR that can be configured with the sensing, processing, and memory devices and subsystems necessary and/or useful for lane building or depletion in accordance with aspects of the inventive concepts. The robotic vehicle 100 takes the form of an AMR pallet lift, but the inventive concepts could be embodied in any of a variety of other types of robotic vehicles and AMRs, including, but not limited to, pallet trucks, tuggers, and the like.

In this embodiment, the robotic vehicle 100 includes a payload area 102 configured to transport a pallet 104 loaded with goods 106. To engage and carry the pallet 104, the robotic vehicle may include a pair of forks 110, including a first and second fork 10*a, b*. Outriggers 108 extend from the robotic vehicle in the direction of the forks to stabilize the vehicle, particularly when carrying the palletized load 106. The robotic vehicle 100 can comprise a battery area 112 for holding one or more batteries. In various embodiments, the one or more batteries can be configured for charging via a charging interface 113. The robotic vehicle 100 can also include a main housing 115 within which various control elements and subsystems can be disposed, including those that enable the robotic vehicle to navigate from place to place.

The robotic vehicle 100 may include a plurality of sensors 150 that provide various forms of sensor data that enable the robotic vehicle to safely navigate throughout an environment, engage with objects to be transported, and avoid obstructions. In various embodiments, the sensor data from one or more of the sensors 150 can be used for path adaptation, including avoidance of detected objects, obstructions, hazards, humans, other robotic vehicles, and/or congestion during navigation. The sensors 150 can include one or more cameras, stereo cameras 152, radars, and/or laser imaging, detection, and ranging (LiDAR) scanners 154. One or more of the sensors 150 can form part of a 2D or 3D high-resolution imaging system.

Figure 2:
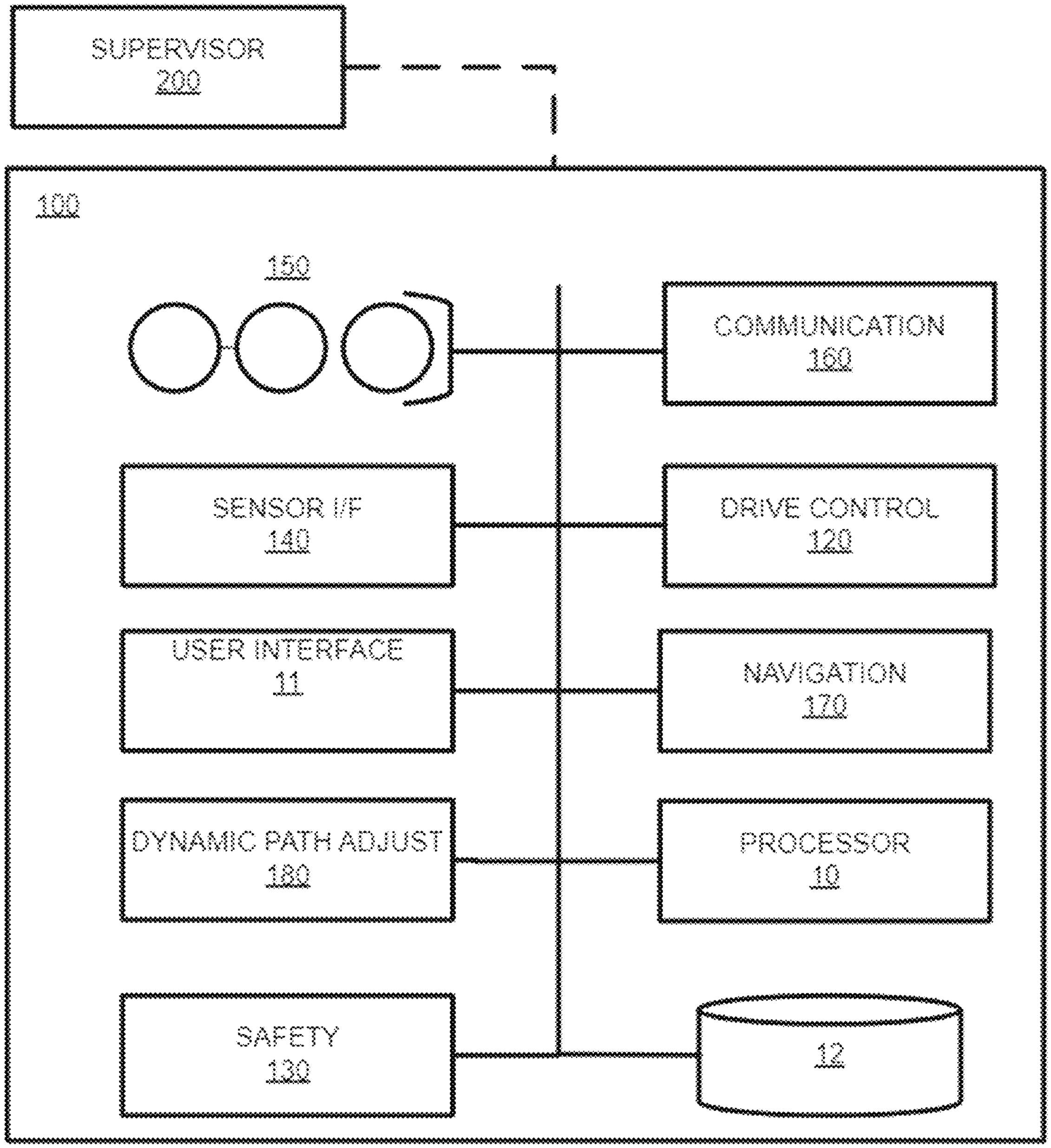
FIG. 2 is an example embodiment of a block diagram of a system such as may embody element of inventive concepts.

FIG. 2 is a block diagram of components of an embodiment of the robotic vehicle 100 of FIG. 1, incorporating intersection access technology in accordance with principles of inventive concepts. The embodiment of FIG. 2 is an example; other embodiments of the robotic vehicle 100 can include other components and/or terminology. In the example embodiment shown in FIGS. 1 and 2, the robotic vehicle 100 is a warehouse robotic vehicle, which can interface and exchange information with one or more external systems, including a supervisor system, fleet management system, and/or warehouse management system (collectively "Supervisor 200"). In various embodiments, the supervisor 200 could be configured to perform, for example, fleet management and monitoring for a plurality of vehicles (e.g., AMRs) and, optionally, other assets within the environment. The supervisor 200 can be local or remote to the environment, or some combination thereof.

In various embodiments, the supervisor 200 can be configured to provide instructions and data to the robotic vehicle 100, and to monitor the navigation and activity of the robotic vehicle and, optionally, other robotic vehicles. The robotic vehicle can include a communication module 160 configured to enable communications with the supervisor 200 and/or any other external systems. The communication module 160 can include hardware, software, firmware, receivers and transmitters that enable communication with the supervisor 200 and any other external systems over any now known or hereafter developed communication technology, such as various types of wireless technology including, but not limited to, Wi-Fi, Bluetooth, cellular, global positioning system (GPS), radio frequency (RF), and so on.

As an example, the supervisor 200 could wirelessly communicate a path for the robotic vehicle 100 to navigate for the vehicle to perform a task or series of tasks. The path can be relative to a map of the environment stored in memory and, optionally, updated from time-to-time, e.g., in real-time, from vehicle sensor data collected in real-time as the robotic vehicle 100 navigates and/or performs its tasks. The sensor data can include sensor data from sensors 150. As an example, in a warehouse setting the path could include a plurality of stops along a route for the picking and loading and/or the unloading of goods. The path can include a plurality of path segments. The navigation from one stop to another can comprise one or more path segments. The supervisor 200 can also monitor the robotic vehicle 100, such as to determine robotic vehicle's location within an environment, battery status and/or fuel level, and/or other operating, vehicle, performance, and/or load parameters.

In example embodiments, a path may be developed by "training" the robotic vehicle 100. That is, an operator may guide the robotic vehicle 100 through a path within the environment while the robotic vehicle, through a machine-learning process, learns and stores the path for use in task performance and builds and/or updates an electronic map of the environment as it navigates. Intersection behaviors, such as access requests or access release behaviors, may be input by a trainer when an AMR is being trained on a path. The path may be stored for future use and may be updated, for example, to include more, less, or different locations, or to otherwise revise the path and/or path segments, as examples.

As is shown in FIG. 2, in example embodiments, the robotic vehicle 100 includes various functional elements, e.g., components and/or modules, which can be housed within the housing 115. Such functional elements can include at least one processor 10 coupled to at least one memory 12 to cooperatively operate the vehicle and execute its functions or tasks. The memory 12 can include computer program instructions, e.g., in the form of a computer program product, executable by the processor 10. The memory 12 can also store various types of data and information. Such data and information can include route data, path data, path segment data, pick data, location data, environmental data, and/or sensor data, as examples, as well as the electronic map of the environment.

In this embodiment, the processor 10 and memory 12 are shown onboard the robotic vehicle 100 of FIG. 1, but external (offboard) processors, memory, and/or computer program code could additionally or alternatively be provided. That is, in various embodiments, the processing and computer storage capabilities can be onboard, offboard, or some combination thereof. For example, some processor and/or memory functions could be distributed across the supervisor 200, other vehicles, and/or other systems external to the robotic vehicle 100.

The functional elements of the robotic vehicle 100 can further include a navigation module 110 configured to access environmental data, such as the electronic map, and path information stored in memory 12, as examples. The navigation module 170 can communicate instructions to a drive control subsystem 120 to cause the robotic vehicle 100 to navigate its path within the environment. During vehicle travel, the navigation module 170 may receive information from one or more sensors 150, via a sensor interface (I/F) 140, to control and adjust the navigation of the robotic vehicle. For example, the sensors 150 may provide sensor data to the navigation module 170 and/or the drive control subsystem 120 in response to sensed objects and/or conditions in the environment to control and/or alter the robotic vehicle's navigation. As examples, the sensors 150 can be configured to collect sensor data related to objects, obstructions, equipment, goods to be picked, hazards, completion of a task, and/or presence of humans and/or other robotic vehicles.

A safety module 130 can also make use of sensor data from one or more of the sensors 150, including LiDAR scanners 154, to interrupt and/or take over control of the drive control subsystem 120 in accordance with applicable safety standard and practices, such as those recommended or dictated by the United States Occupational Safety and Health Administration (OSHA) for certain safety ratings. For example, if safety sensors detect objects in the path as a safety hazard, such sensor data can be used to cause the drive control subsystem 120 to stop the vehicle to avoid the hazard.

The sensors 150 can include one or more stereo cameras 152 and/or other volumetric sensors, sonar sensors, and/or LiDAR scanners or sensors 154, as examples. Inventive concepts are not limited to particular types of sensors. In various embodiments, sensor data from one or more of the sensors 150, e.g., one or more stereo cameras 152 and/or LiDAR scanners 154, can be used to generate and/or update a 2-dimensional or 3-dimensional model or map of the environment, and sensor data from one or more of the sensors 150 can be used for the determining location of the robotic vehicle 100 within the environment relative to the electronic map of the environment.

Examples of stereo cameras arranged to provide 3-dimensional vision systems for a vehicle, which may operate at any of a variety of wavelengths, are described, for example, in U.S. Pat. No. 7,446,766, entitled Multidimensional Evidence Grids and System and Methods for Applying Same and U.S. Pat. No. 8,427,472, entitled Multi-Dimensional Evidence Grids, which are hereby incorporated by reference in their entirety. LiDAR systems arranged to provide light curtains, and their operation in vehicular applications, are described, for example, in U.S. Pat. No. 8,169,596, entitled System and Method Using a Multi-Plane Curtain, which is hereby incorporated by reference in its entirety.

In example embodiments a trainer may employ an AMR's user interface 11 to load behaviors as the trainer trains the AMR to execute a path. The behavior may be associated with entering an intersection when an intersection is encountered along the AMR's training path. Similarly, a trainer may employ the AMR's user interface 11 to load a behavior associated with exiting an intersection when the AMR encounters an exit along the AMR's training path. The locations of intersections may be known to the trainer before training the AMR, may be identified by the trainer as the trainer is training the AMR, or may be delivered to the trainer as the trainer executes the training process, from a processor, such as a supervisory processor, for example.

In example embodiments an entrance behavior may include the AMR's contacting of a processor, such as a supervisory processor, to request access to the intersection in question. That is, during training, the AMR may be trained to execute an intersection entrance behavior that includes requesting access to the intersection from a supervisory processor. In its request the AMR may include information that enables the supervisory processor to determine whether the requesting AMR may have access to the intersection or what type or access the AMR may have to the intersection. Such information may include an AMR identifier, the AMR's path, and the type of travel the AMR is to make through the intersection, for example. The type of travel may include whether the AMR is traveling through the intersection in a straight line or it is altering its travel direction within the intersection. If, for example, the AMR is to turn within the intersection, it may reverse course to make the turn and this reversal may impact the type of access granted to the AMR by the supervisory processor. In some embodiments the behavior may include a fault activity, should the access not be granted for an extended period of time. The fault activity may include contacting the supervisory processor, setting an alarm, providing visual, or other indicia of access failure, for example.

Figure 3:
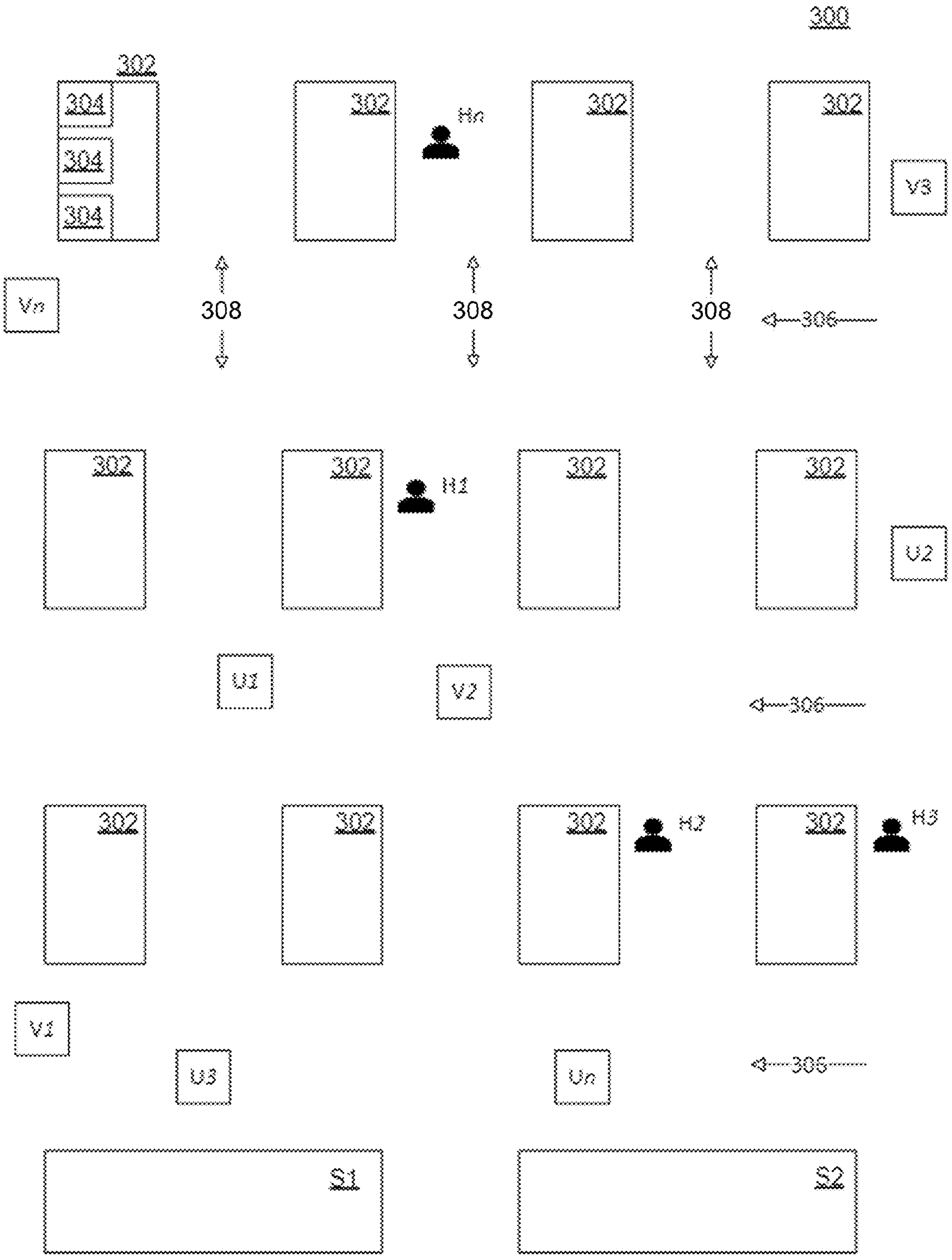
FIG. 3 is an illustration of a warehouse such as may employ a system and method in accordance with principles of inventive concepts.

FIG. 3 depicts a warehouse in which an example embodiment of a system and method in accordance with principles of inventive concepts may be employed. In example embodiments a material flow system in accordance with principles of inventive concepts may be implemented in a facility such as a manufacturing, processing, or warehouse facility, for example. For brevity and clarity of description the example embodiments described herein will generally be in reference to warehouse implementations, but inventive concepts are not limited thereto.

In the example embodiment of FIG. 3 items are stored in storage racks 302 distributed throughout a warehouse 300. Storage racks 302 may be divided into bays 304 and bays 304 may be further divided into shelves, for example. Racks 302 may be configured to store items within bins, on any of a variety of pallets, or other materials handling storage units. Racks 302 may be single- or multi-level, for example, and may vary in width, length, and height. Staging areas S1 and S2 may be used to temporarily store items for shipping or receiving, respectively, to/from transportation means, such as truck or train for example, to external facilities. Rows 306 and aisles 308 provide access to storage racks 302. Vehicles V1, V2, V3 . . . Vn, may be of any of a variety of types, described for example, in the discussion related to FIG. 1 and may be operated to move items among racks 302 and staging areas S1, S2. Although, in practice, vehicles V1, V2, V3 . . . , Vn may be any type of vehicle, for this example embodiment we will assume that they are AMRs. One or more user interfaces UI1, UI2, UI3 . . . , Un may be distributed throughout the warehouse 300. The user interfaces UI1, UI2, UI3 . . . , Un may be employed by an operator to interact with a system such as one described in the discussion related to FIG. 2 to direct a vehicle to pick an item from one location (a specific storage rack, for example) and to place it in another location (staging area S1, for example). The user interfaces, UI1, UI2, UI3 . . . , Un, may be included within AMRs, may be in standalone screens or kiosks positioned throughout the warehouse, may be handheld electronic devices, or may be implemented as applications on smartphones or tables, for example.

In contrast with a conventional approach that requires an operator to lay out every move with precision, covering all the alternative possibilities, a system and method in accordance with principles of inventive concepts allows an operator to initiate the movement of items within a facility such as a warehouse with a high degree of flexibility and ease. In example embodiments a system and method in accordance with principles of inventive concepts may allow an operator (also referred to herein as a user) to configure the movement of materials from one location to another within a facility such as a warehouse. Such movement may be, for example, the movement of one or more items from a storage area to a staging area, or vice versa, the movement of one or more items from a staging area to a storage area. Such movement may be referred to herein as a "job." A job may be created to fill an order for example, and may entail the movement of one or more items from one or mor storage areas by one or more vehicles to a staging area. At the staging area the items are assembled for loading and shipping. On the other hand a job may entail one or more vehicles moving items from a receiving area to one or more locations within the facility.

Figure 4:
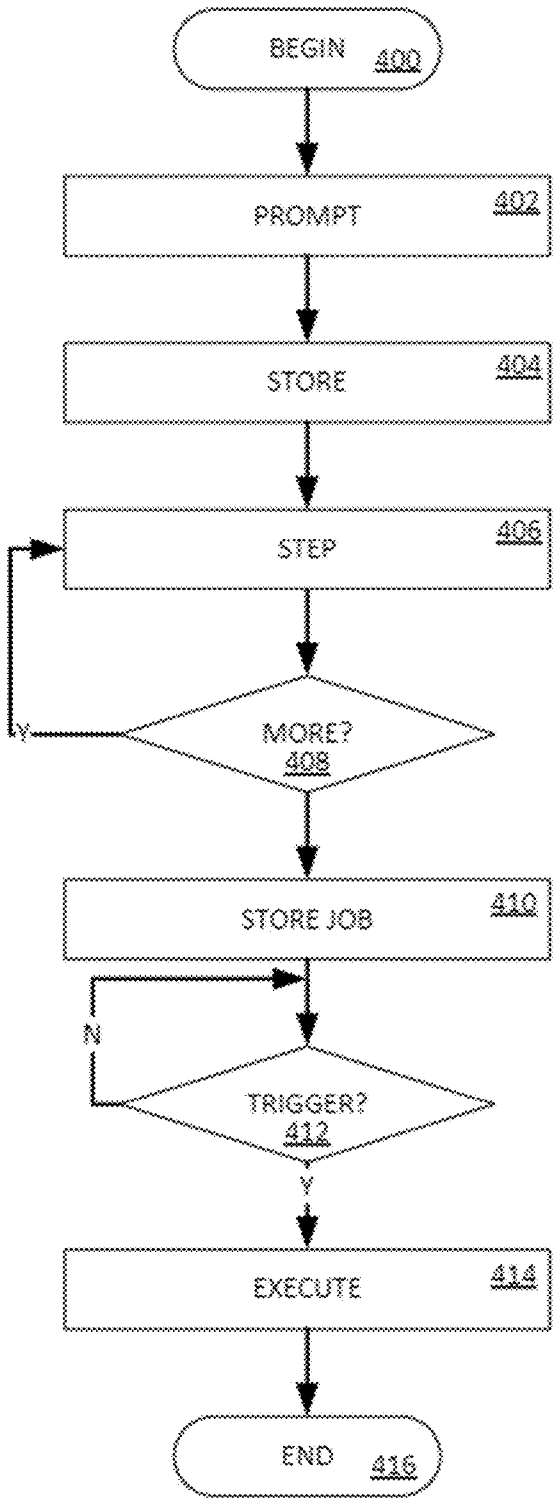
FIG. 4 is a flow chart of an example embodiment of a process whereby a job is created in accordance with principles of inventive concepts.

The flowchart of FIG. 4 depicts an example embodiment of a process for job creation, that is a material flow process creation, in accordance principles of inventive concepts. The process begins in step 400 where the system, through a processor such as supervisory processor 200 as previously described, responds to input from an operator, which may have been input through a user interface such as a user interface UI1, UI2, UI3 . . . , Un. The process proceeds from step 400 to step 402 where a processor, such as supervisory processor 200 or a processor implemented within the user interface device, provides an input screen and prompts the operator to enter the requisite input for the formation of a material flow process, or job. In step 404 the system stores a trigger that has been entered by the operator and prompts the operator to begin entering step information (e.g., "go here and do this") as previously described. In example embodiments, although users may trigger a job request and fill in information about the locations as the job is being requested, the job may not be requested until the job template is stored (i.e., after step 410).

Figure 5:
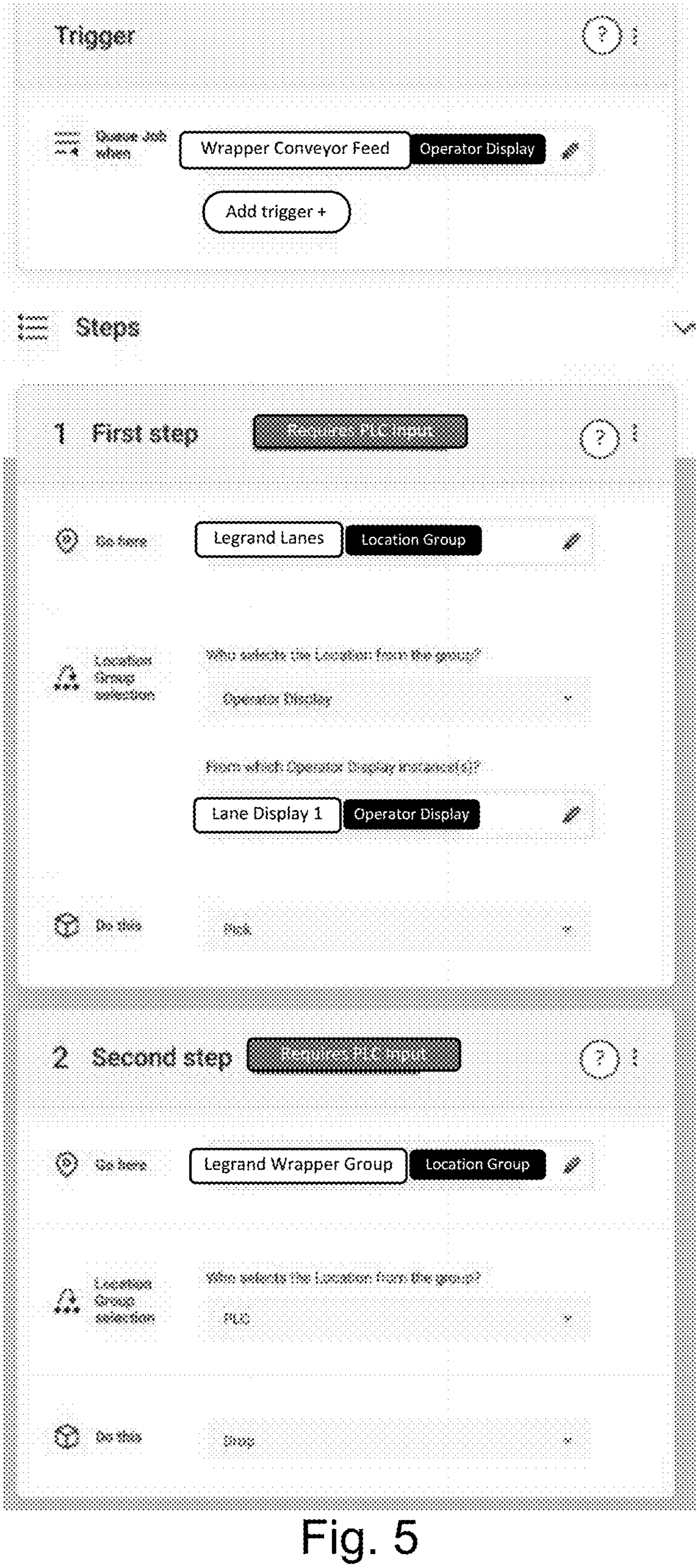
FIG. 5 is an illustration of an example user interface such as may be employed in a system and method in accordance with principles of inventive concepts.

One of the great advantages of a system and method in accordance with principles of inventive concepts is that the system, through a fleet management function, keeps tabs on what type of vehicles may be in the warehouse, what type of storage (e.g., pallet or bin) the vehicles can handle, and what type of storage is used for every item in the warehouse. An operator only needs to indicate where a vehicle is to proceed and what it is to do when it gets there; the system determines which vehicle of which type will be dispatched to execute the operation. When the step information is entered, which may include "group location information," as described in greater detail in the discussion related to FIG. 5, the process proceeds to step 408 where the system determines whether there are more steps to the job being entered. This determination may be made through an operator input, through a separate command or through an entry within a step screen. If there are more steps for the job, the process returns to step 406 and on from there as described. If there are no more steps, the process proceeds to step 410 where the system stores the job. In step 412 the process monitors the appropriate inputs to determine when a trigger conditions has been met. If the trigger condition has been met the process proceeds to step 414 where the system executes the job. As previously noted, during execution of the job the system may select one or more appropriate AMRs to execute the job, according to their load handling capabilities and the type of load involved. When the job is completed the process proceeds to end in step 416.

In example embodiments jobs, or material flow processes, may be configured locally with a processor and application included in a user interface devices, such as a smartphone, tablet, or dedicated user interface device; through a facility-wide device such as a supervisory processor that includes a fleet management system; or through a web application, for example. In example embodiments the process entails: giving the job a case-insensitive unique name that is used in a user interface including an operator display to identify the job. The job is given a trigger event (as described above) and the trigger. In example embodiments the trigger event can be input from an operator display, from a PLC, from fleet management processor, for example. In example embodiments, an operator may specify a robot group, which allows the operator to select a group of robots within the facility from which an AMR is to be selected to execute the job when it is triggered. Robot groups may be organized according to the type of robot (e.g., tugger or forklift), according to the type of material they are a designed to move, or according to other criteria. In example embodiments, robot groups may also be organized according to the workflow they are required to service. A facility might have several workflows, each quoted to require a specific number of AMRs. A workflow might require one or more job templates. If one workflow spikes in utilization, is suddenly in heavy use, the workflow might require all the AMRs in the facility and starve, or block, the other workflows. As a result, a user might want to restrict certain trucks to only work certain jobs in the workflow they are required to service.

, In example embodiments each job includes at least one step and each step may include two elements: a "go here" type of element and a "do this" type of element. Regarding the "go here," element, this element provides the location the robot will travel to for this step when assigned the job. The location can be: either an individual location, or a location group if the specific location. A location group may be employed to provide flexibility and to allow an operator to configure a job even if the specific location of the robot's destination will not be determined until after the job is requested. In example embodiments, if a group location group is selected (rather than a specific location), the system produces an additional field in the user interface appears, which requires the operator to indicate where the selection of the specific location from within the location group come from. That is, the operator is to enter what entity: an operator using an interface; a supervisory processor; or a PLC, for example, decides the specific location from within the group the robot is to travel to in that step. Regarding the "do this" or "action" element, this is the action the AMR will perform at the designated location, and may be to pick or drop material, to wait, to hitch, to unhitch, to lift, or to exchange, for example.

Once a job, created by an operator, has been saved by a system in accordance with principles of inventive concepts, it may be requested, or initiated, by the specified trigger. A jobs framework in accordance with principles of inventive concepts is not AMR dependent and may be applied to any of a variety of AMR chassis, regardless of manufacturer of type (e.g., taxi, trucking, etc.).

In the example embodiment of FIG. 5*a* trigger section indicates that the job is to be queued when an operator requests the job using the "wrapper conveyor feed" through an operator display. The first step indicates that the location, the "go here" core element, is location group "L Lanes" and that the action, "do this" element is to pick. A location group selection, the entity that is to make the selection from among locations in location group "L Lanes," is given as an operator display. The second step includes the location, the "go here" core element of "L Wrapper Group," that the selection of locations from among the group of locations included in the "L Wrapper Group" is to be made by a PLC, and that the action to be carried out is a drop.

In example embodiments, at least two elements may be included in a system and method: a trigger section and one or more job steps. Additionally, the option of selecting a location group or a robot group is provided in example embodiments. The trigger section allows for a logical condition to be configured that, if met, will fire an instance of a job. The job step can include user-configurable "Go here" and "Do this" instructions, or sections. The ability to select a Location Group in the "Go here" section allows for one job to address multiple permutations of a job (e.g., pick here and drop at one of these 5 locations). All possible applications can be modeled with the two core components of: location ("Go here") and action ("Do this"). In example embodiments each step includes the two core components and the system and method allow for as many steps as may be required for a desired material movement.

Figure 6:
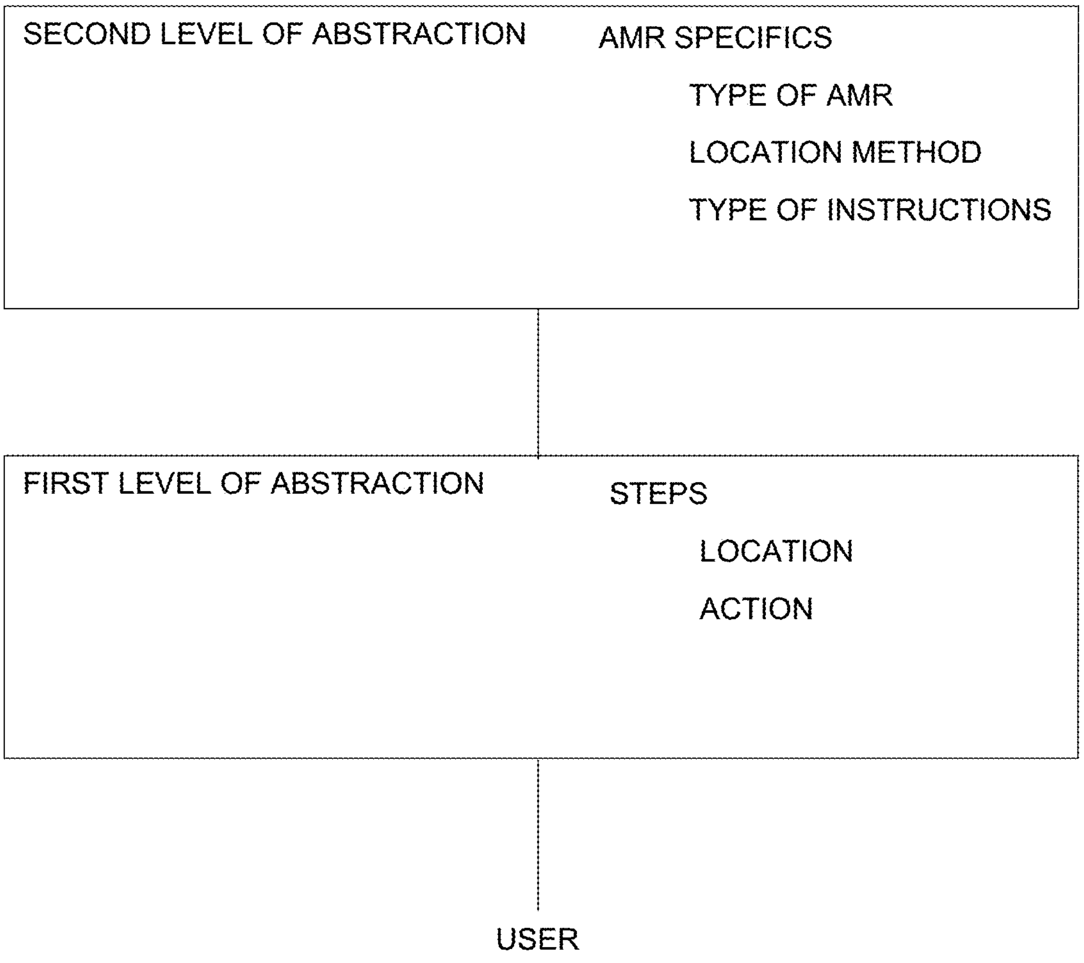
FIG. 6 is an illustration of levels of abstraction provided by a system and method in accordance with principles of inventive concepts.

By breaking a job into a sequence of steps, each with a location and task, a system in accordance with principles of inventive concepts allows users to flexibly describe a host of AMR material movements with minimal complexity. Using the first level of abstraction, a step sequence as described above, a system and method in accordance with principles of inventive concepts, abstracts away from the user a second layer of abstraction, which provides a high level of flexibility. As illustrated in the block diagram of FIG. 6, the second layer of abstraction identifies: 1) the type of AMR required, such as a tugger or pallet truck, 2) the method by which the AMR understands locations, and 3) the type of instructions the AMR can process. In operation, when a job is requested by a user, the system itself, via a processor such as the supervisory processor that monitors and controls the operations of AMRs within the fleet of AMRs, uses the steps developed at the first abstraction level by the operator to determine, at the second level of abstraction, the type of AMR required to execute the job and translates the sequence of job steps into instructions the AMR understands.

Figure 7A:
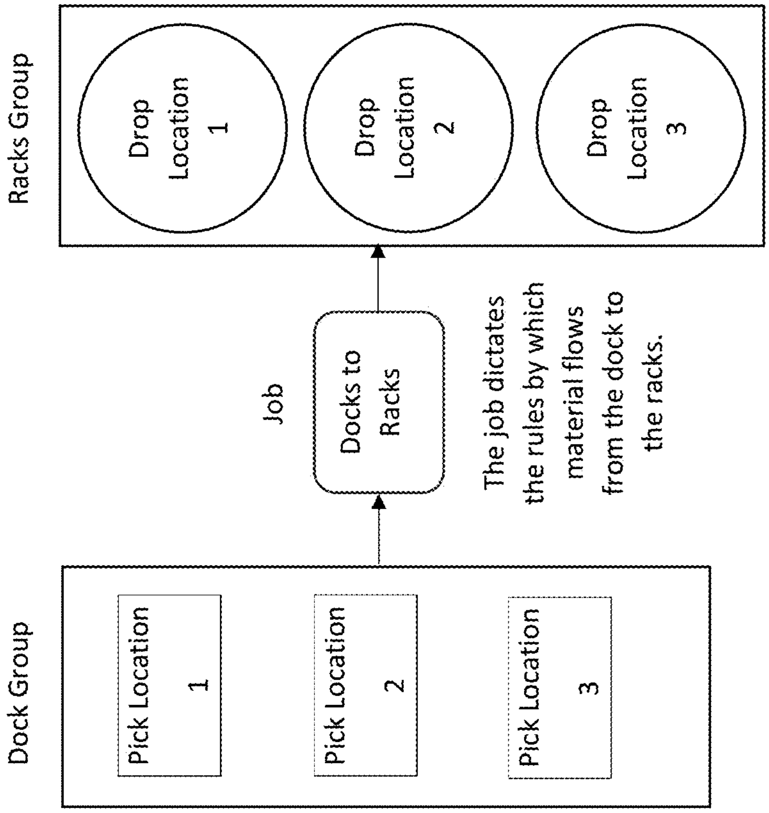
FIGS. 7A and 7B illustrate the flexibility of job creation afforded by a system and method in accordance with principles of inventive concepts.

In the example embodiment of FIG. 7A, the location group is a dock group (e.g., a group of locations at a warehouse's receiving dock). A job may be configured to move one or more items from a location within the dock group to a location within another group, a rack group (a group of racks within the body of the warehouse, for example). In this example one step may include the elements "go to a location within the dock group" and the action-related element may be to "pick" at a specified location within that group. Another step may include the elements "go to a location within the rack group" and the action-related element may be to "drop" or "place at a specified location within the rack group. As previously described, there are a variety of entities that may be specified as the determiners of which location within a location group is to be used. In this example we assume that that determination will be made by an operator (through a graphical user interface, for example). After configuring the job, or job template, the operator may save the job template. Then when a customer's production starts running an operator requests an instance of the job template they (or another operator) previously created. They may then go through the template and select the appropriate locations within location groups to satisfy requirements of the customer's production run, selecting, for example, "pick location 1" as the specific location for step 1, without selecting a specific location for step 2. When an AMR becomes available and is assigned the requested job the AMR is instructed, according to the requested job, to pick at location 1. If, as in this scenario, the location for step 2 has not yet been selected, the AMR awaits at or near the location of its pick (the location of step 1) for the operator to provide the necessary information for step 2. In this example the operator may then select a specific drop location within the racks group (e.g., racks group location B) as the location for step 2. The AMR is instructed to drop at location B and the AMR executes the remaining step and completes the job.

A simple material movement process might need to, on request, pick from location 1 and drop at location 2. A variation of this process might need to do this process, not on request, but continuously. In example embodiments a system and method in accordance with principles of inventive concepts allows a user to execute such a variation, a continuous/repeated pick and drop, by indicating that the job should loop and by setting the job's trigger, accordingly. Users can switch between these two similar, but different, types of processes by changing two configurations in a job template in accordance with principles of inventive concepts, during configuration, employing a user interface, for example.

In example embodiments, additional variations on workflows include the number of steps in a job, just-in-time location input, composition of multiple jobs to work together to perform a single process. All of these variations only require small changes to the configuration of the components that make up this framework. Users do not need to conceive of the AMR control logic needed to enable these workflows, implement them, and debug them.

Figure 7B:
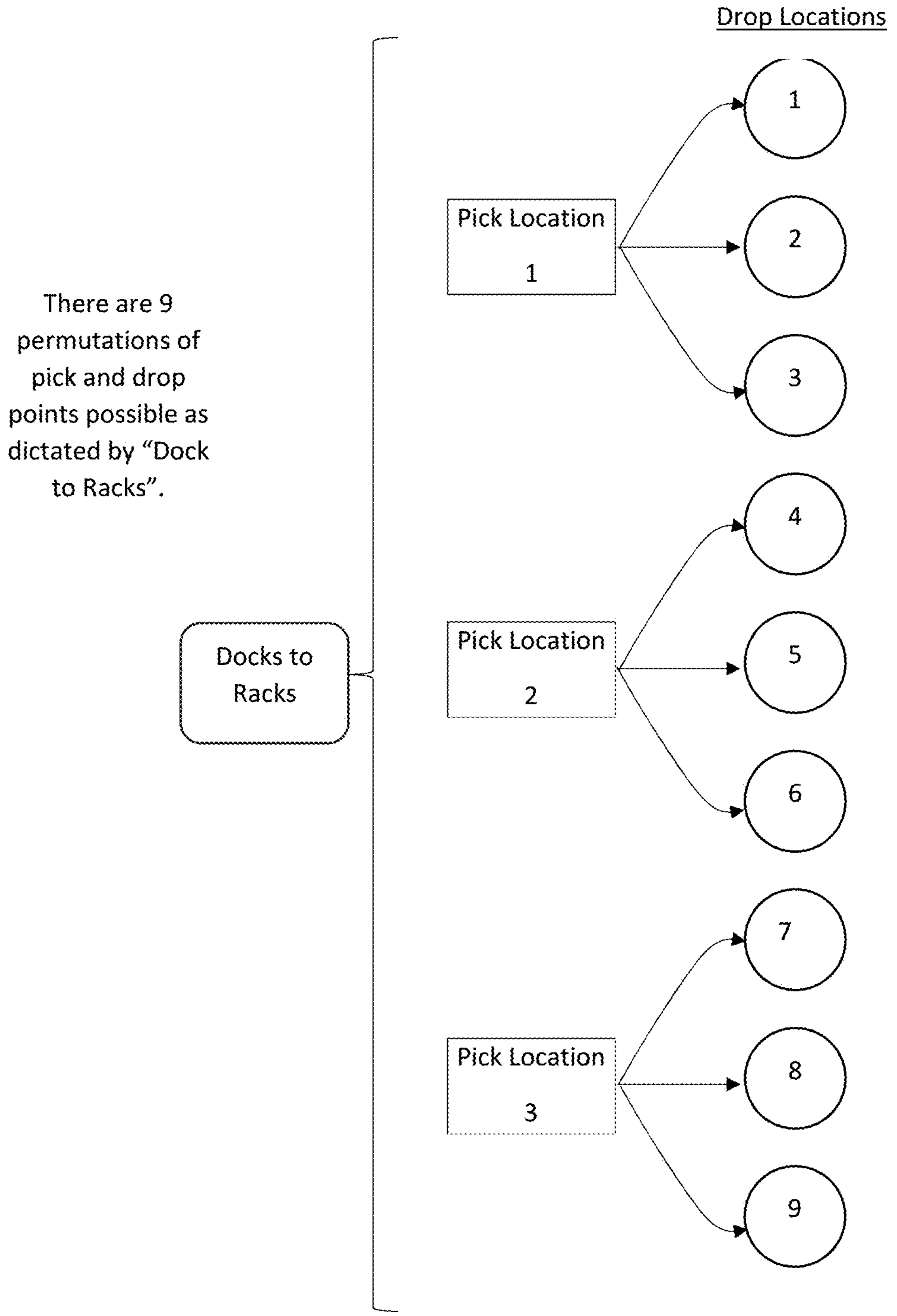

In contrast, when using "If this, then that" rules, to create the "on request" workflow, users must first conceive the rules necessary to request, queue, and assign routes to AMRs, create, and then inevitably debug those rules much like one would a software program. If they wanted to switch from an "on request" workflow to a "looping" workflow they would need to again conceive of the rules to force the AMR to perform a follow in a loop, create the rules, and debug them. In a conventional approach, as illustrated in FIG. 7B, may require an operator to enter every conceivable permutation of operations to execute a job. In the above example, if there are three locations within the dock group and three locations within the rack group an operator would have to enter a step for picking at dock group location A and dropping at rack group location A, picking at dock group location A and dropping at rack group location B, picking at dock group location A and dropping at rack group location B, picking at dock group location B and dropping at rack group location A, etc.—a much longer and more tedious process that is prone to operator error. In this scenario, an operator defines nine rules. Each rule follows the general pattern, "If switch n is true, then dispatch AMR to Pick Location X and Drop Location Y." When a customer's production starts running, an operator finds the switch corresponding to the permutation of the job needed at the moment and presses it and an available AMR is assigned the route linked to the switch, then executes the route.

In such a conventional approach, no mechanism is given for providing input while the job is executing. Doing so would require even more pre-configuration via additional rules that must be created by a user. Such process might entail a user defining nine rules, one for each permutation of picks and drops. Each rule would follow the general pattern, "If switch n is true, then dispatch AMR to Pick Location X." The operator defines another set of nine rules that follow the pattern, "If AMR is at Pick Location X AND Switch Z is true, then travel to Drop Location Z." When a customer's production starts running an operator finds the switch n corresponding to the permutation of the job needed at the moment and presses it. An available AMR would be assigned the route linked to the switch n, and execute it. The AMR would then wait at the location for additional input. If the operator then presses the switch Z corresponding to the requested drop location, the AMR travels to the drop location.

These rules are a simplification and assume that there is only one AMR in the facility. There is no notion of a job executed by a specific AMR in this conventional approach, which makes tracking which unit of work an AMR is doing very difficult as the number of AMRs and complexity of tasks increase. Such a conventional "If this, then that" style fleet management system as this is highly flexible, but requires enormous upfront configuration. Additionally, as the scale of a customer's facility and operations increase there is an inflection point where the complexity and number of rules becomes untenable. A system and method in accordance with principles of inventive concepts strikes the right balance between flexibility and simplicity of configuration by implementing common design patterns created in a rules based approach into the system itself, allowing, for example, as the ability to provide input while a job is executing.

Inventive concepts may be implemented as part of a total automated mobile robot (AMR), fleet management system (FMS), warehouse management system (WMS), or other system which can take the form of a total package of hardware, software and integrations that allows a user to establish material flow automation in their facility. In various embodiments described herein there are multiple variations of how selections for the system are made. These selections could involve a human operator and/or another automation system, for example.

While the foregoing has described what are considered to be the best mode and/or other preferred embodiments, it is understood that various modifications can be made therein and that aspects of the inventive concepts herein may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the inventive concepts, which are, for clarity, described in the context of separate embodiments, may also be provide in combination in a single embodiment. Conversely, various features of the inventive concepts which are, for brevity, described in the context of a single embodiment may also be provided separately or in any suitable sub-combination.

For example, it will be appreciated that all of the features set out in any of the claims (whether independent or dependent) can combined in any given way.

Below follows an itemized list of statements describing embodiments in accordance with the inventive concepts:

1. A system, comprising:

at least one autonomous mobile robot (AMR); and a management system comprising at least one processor configured to provide a framework for user-configurable control of an AMR, the control comprising a job of one or more steps, each step including a location and a task to be performed by an AMR.

2. The system of statement 1, or any other statement or combinations of statements, wherein a job may be defined as a series of steps created by a user through a user interface.

3. The system of statement 1, or any other statement or combinations of statements, wherein a task may be chosen from a group of tasks including: an AMR pick or AMR drop.

4. The system of statement 1, or any other statement or combinations of statements, further comprising a job trigger to allow the selection of a logical condition to be configured to fire an instance of a job.

5. The system of claim 1, further comprising a processor configured to allow a user to specify a group of locations from among which the location is to be selected.

6. The system of statement 5, or any other statement or combinations of statements, further comprising a processor configured to allow a user to specify an entity that is to select a location from among locations in a specified group of locations.

7. The system of statement 5, or any other statement or combinations of statements, further comprising a processor configured to allow a user to specify a group of robots from which to select a robot to carry out a step at runtime.

8. The system of statement 7, or any other statement or combinations of statements, further comprising a processor configured to select a robot from the specified group of robots to carry out a step at runtime.

9. A method, comprising:

at least one AMR operating under control of a management system; and a management system comprising at least one processor providing a framework for user-configurable control of an AMR, the control comprising a job of one or more steps, each step including a location and a task to be performed by an AMR.

10. The method of statement 9, or any other statement or combinations of statements, wherein a job is carried out as a series of steps created by a user through a user interface.

11. The method of statement 9, or any other statement or combinations of statements, wherein the system is responsive to a task chosen from a group of tasks including: an AMR pick or AMR drop.

12. The method of statement 9, or any other statement or combinations of statements, further comprising job trigger responding to the selecting of a logical condition to be configured to fire an instance of a job.

13. The method of statement 9, or any other statement or combinations of statements, further comprising a processor allowing a user to specify a group of locations from among which the location is to be selected.

14. The method of statement 13, or any other statement or combinations of statements, further comprising a processor allowing a user to specify an entity that is to select a location from among locations in a specified group of locations.

15. The method of statement 13, or any other statement or combinations of statements, further comprising a processor allowing a user to specify a group of robots from which to select a robot to carry out a step at runtime.

16. The method of statement 15, or any other statement or combinations of statements, further comprising a processor selecting a robot from the specified group of robots to carry out a step at runtime.

17. A system, comprising:

a management system comprising at least one processor, wherein the processor is configured to:

manage a fleet of one or more AMRs, including tracking the location and capabilities of the one or more AMRs; and to provide a framework for user-configurable control of an AMR, the control comprising a job of one or more steps, each step including a location and a task to be performed by an AMR.

18. The system of statement 17, or any other statement or combinations of statements, wherein a job may be defined as a series of steps created by a user through a user interface.

19. The system of statement 17, or any other statement or combinations of statements, wherein a task may be chosen from a group of tasks including: an AMR pick or AMR drop.

20. The system of statement 17, or any other statement or combinations of statements, further comprising a job trigger to allow the selection of a logical condition to be configured to fire an instance of a job.

What is claimed is:

1. A system, comprising:

at least one autonomous mobile robot (AMR); and a management system comprising at least one processor configured to provide a framework for user-configurable control of an AMR, the control comprising a job of one or more steps, each step including a location and a task to be performed by an AMR, wherein, for at least one step of the job, the location is not specified when the job is created and is received after the job is triggered, wherein the AMR is configured to autonomously travel to the location and perform the task configured in the job and the task entails the AMR physically interacting with an object.

2. The system of claim 1, wherein a job may be defined as a series of steps created by a user through a user interface.

3. The system of claim 1, wherein a task may be chosen from a group of tasks including: an AMR pick or AMR drop.

4. The system of claim 1, further comprising a job trigger to allow the selection of a logical condition to be configured to fire an instance of a job.

5. The system of claim 1, further comprising a processor configured to allow a user to specify a group of locations from among which the location is to be selected.

6. The system of claim 5, further comprising a processor configured to allow a user to specify an entity that is to select a location from among locations in a specified group of locations.

7. The system of claim 1, further comprising a processor configured to allow a user to specify a group of robots from which to select a robot to carry out a step at runtime.

8. The system of claim 7, further comprising a processor configured to select a robot from the specified group of robots to carry out a step at runtime.

9. A method, comprising:

at least one AMR operating under control of a management system; and a management system comprising at least one processor providing a framework for user-configurable control of an AMR, the control comprising a job of one or more steps, each step including a location and a task to be performed by an AMR, wherein, for at least one step of the job, the location is not specified when the job is created and is received after the job is triggered, wherein the AMR autonomously travels to the location and performs the task configured in the job and the task entails the AMR physically interacting with an object.

10. The method of claim 9, wherein a job is carried out as a series of steps created by a user through a user interface.

11. The method of claim 9, wherein the system is responsive to a task chosen from a group of tasks including: an AMR pick or AMR drop.

12. The method of claim 9, further comprising job trigger responding to the selecting of a logical condition to be configured to fire an instance of a job.

13. The method of claim 9, further comprising a processor allowing a user to specify a group of locations from among which the location is to be selected.

14. The method of claim 13, further comprising a processor allowing a user to specify an entity that is to select a location from among locations in a specified group of locations.

15. The method of claim 9, further comprising a processor allowing a user to specify a group of robots from which to select a robot to carry out a step at runtime.

16. The method of claim 15, further comprising a processor selecting a robot from the specified group of robots to carry out a step at runtime.

17. A system, comprising:

a management system comprising at least one processor, wherein the processor is configured to:

manage a fleet of one or more AMRs, including tracking the location and capabilities of the one or more AMRs; and to provide a framework for user-configurable control of an AMR, the control comprising a job of one or more steps, each step including a location and a task to be performed by an AMR, wherein, for at least one step of the job, the location is not specified when the job is created and is received after the job is triggered, wherein the AMR is configured to autonomously travel to the location and perform the task configured in the job and the task entails the AMR physically interacting with an object.

18. The system of claim 17, wherein a job may be defined as a series of steps created by a user through a user interface.

19. The system of claim 17, wherein a task may be chosen from a group of tasks including: an AMR pick or AMR drop.

20. The system of claim 17, further comprising a job trigger to allow the selection of a logical condition to be configured to fire an instance of a job.

* * * * *